United States Patent [19]
Sawada

[11] Patent Number: 5,596,464
[45] Date of Patent: Jan. 21, 1997

[54] LOCKING ASSEMBLY FOR A LID MEMBER OF A TAPE CASSETTE

[75] Inventor: Takashi Sawada, Kanagawa, Japan

[73] Assignee: Sony Corporation, Tokyo, Japan

[21] Appl. No.: 319,562

[22] Filed: Oct. 7, 1994

[30] Foreign Application Priority Data

Oct. 12, 1993 [JP] Japan .................................. 5-277302
Feb. 1, 1994 [JP] Japan .................................. 6-027561

[51] Int. Cl.$^6$ .................................................. G11B 23/02
[52] U.S. Cl. ...................................... 360/132; 360/132
[58] Field of Search ............................. 360/132; 242/347, 242/347.2

[56] References Cited

U.S. PATENT DOCUMENTS

| | | | |
|---|---|---|---|
| 5,084,799 | 1/1992 | Yeol | 360/132 |
| 5,170,962 | 12/1992 | Iwahashi | 360/132 |
| 5,337,204 | 8/1994 | Fujii | 360/132 |

*Primary Examiner*—A. J. Heinz
*Attorney, Agent, or Firm*—William S. Frommer; Alvin Sinderbrand

[57] ABSTRACT

A tape cassette which is convenient for minimization is provided. A cassette case is formed from an upper half and a lower half. A back lid includes a front lid, a back lid and a top lid, and covers over a portion of a magnetic tape positioned outside the cassette case. A lid locking member is mounted on the cassette case for engaging with an arresting recessed portion of the front lid to lock the lid member at a closed position. A torsion spring for biasing the lid member toward the closed position is resiliently contacted at an arm thereof with a spring anchoring portion of the lid locking member to exert a pivoting force to pivot the lid locking member to its locking position. A stopper portion is provided on the lower half such that an abutting portion of the lid locking member may be abutted therewith to prevent excessive pivotal motion of the lid locking member toward the locking position.

3 Claims, 12 Drawing Sheets

LOCKING ASSEMBLY FOR A LID MEMBER OF A TAPE CASSETTE

BACKGROUND OF THE INVENTION

This invention relates to a novel tape cassette, and more particularly to a novel tape cassette of a small size which includes a lid member for covering over, when the tape cassette is not used, a recording medium tape to protect the recording medium tape and a locking member for locking the lid member at a closed position at which the lid member protects the recording medium tape.

A tape cassette normally includes, in order to protect a portion of a recording medium tape such as a magnetic tape positioned along a front face of a tape extraction recessed portion formed on a front face of a cassette case formed from upper and lower halves, a lid member for removably covering over the portion of the magnetic tape.

An exemplary one of tape cassettes of the type described above is shown in FIGS. 11 and 12.

Referring to FIGS. 11 and 12, the tape cassette shown is generally denoted at a and is constituted from an upper half c and a lower half d coupled in a vertically aligned relationship to each other.

A recessed portion e called mouth portion is formed at a substantially center of a front portion of the cassette case b such that it is opened forwardly and upwardly and downwardly.

A magnetic tape f is wound on a pair of tape reels not shown and accommodated in the cassette case b. A portion of the magnetic tape f is led out from the cassette case b to the outside and is positioned, when the tape cassette a is not used, along a front face of the mouth portion e.

A lid member g is provided to cover over, when the tape cassette a is not used, the portion of the magnetic tape f led out from within the cassette case b to protect the magnetic tape f. The lid member g is formed from a front lid h and a back lid i.

The front lid h has a front portion j for covering over the front face side of the magnetic tape f and a pair of side portions k (only one is shown in FIGS. 12 and 13) extending rearwardly from the opposite side edges of the front portion j. A pivot shaft 1 is formed on each of the side portions k of the front lid h.

A spring anchoring projection m is formed on one of the side portions k of the front lid h.

The front lid h is supported for pivotal portion on the cassette case b with the pivot shafts 1 thereof fitted in a pair of support holes formed at front end portions of a pair of side walls of the cassette case b.

A torsion spring n is fitted at a coiled portion o thereof around one of the pivot shafts 1 and has an arm p resiliently contacted from above with the spring anchoring projection m. The other arm q of the torsion spring n is resiliently contacted with a locking member which will be hereinafter described.

The back lid i has a main portion r in the form of a plate and a top plate portion s formed integrally at the top end of the main portion r. The back lid i is supported, at portions of the opposite side portions of the main portion 4 a little lower than the middle position in the vertical direction, for pivotal motion on the inner face side of the front portion j of the front lid h.

A pair of projections t (only one is shown in FIGS. 11 and 12) extend rearwardly from lower end portions of the opposite side edges of the main portion r of the back lid i, and a pair of guide pins u (only one is shown in FIGS. 11 and 12) are formed on outer side faces of rear end portions of the projections t. The guide pins u are held in sliding engagement with a pair of guideways not shown formed on the opposing inner side faces of the mouth portion e.

A locking member v is provided for locking the lid member g at a closed position when the tape cassette a is not used. The locking member v has a substantially vertically elongated profile and is supported at an upper end portion thereof for pivotal motion on one of the side walls of the cassette case b.

The locking member v has a spring anchoring portion w formed at an upper end thereof such that it projects rearwardly a little, and the arm q of the torsion spring n resiliently contacts from above with the spring anchoring portion w. Consequently, the locking member v is normally acted upon by a resilient pivoting force in the clockwise direction in FIGS. 11 and 12, that is, in a direction in which a lower end portion of the locking member v moves forwardly so that it is engaged at an engaging portion thereof with an engaging portion formed on one of the side portions k of the front lid h under the resilient pivoting force to lock the front lid h at its closed position.

When the tape cassette a is loaded into a recording and reproduction apparatus, an unlocking member provided on the recording and reproduction apparatus pushes a lower end portion of the locking member v relatively rearwardly to cancel the engagement between the engaging portion of the locking member v and the engaging portion of the front lid h to allow movement of the lid member g toward its open position.

Then, when the tape cassette a moves down to a predetermined loaded position, a lid opener not shown provided on the recording and reproduction apparatus is contacted with the lower edge of and pushes one of the side walls k of the front lid h relatively upwardly so that the front lid h is pivoted upwardly against the resilient pivoting force of the torsion spring n. Thereupon, also the back lid i is pivoted with its posture controlled by movements of the pivotal support points thereof supported on the front lid h and guidance of the guide pins u by the guideways until it comes to its open position shown in FIG. 12.

Consequently, the portion of the magnetic tape f positioned along the front face of the mouth portion e is opened or exposed outside.

A pair of substantially semi-circular recesses y (only one is shown in FIGS. 11 and 12) are formed at locations adjacent the front ends of the lower edges of the side walls of the upper half c and serve as support holes for supporting the pivot shafts 1 of the front lid h.

A stopper portion z is formed at a lower edge portion of an outer side face of one of the side walls of the upper half c at a location a little rearwardly of the position at which the recess y is formed.

Upon production of the tape cassette 1, the lid member g is temporarily fastened to the upper half c before the upper half c and the lower half d are coupled to each other.

In particular, the pivot shafts 1 of the front lid h of the lid member g in which the back lid i is assembled to the front lid h are engaged in the recesses y of the upper half c while the coiled portion o of the torsion spring n is fitted around one of the pivot shafts 1 and the arm p of the torsion spring n is resiliently contacted with the spring anchoring projection m, and the other arm q of the torsion spring n is resiliently contacted from above with the stopper portion z to exert an upwardly moving force to the pivot shafts 1 until the pivot shafts 1 are stopped by top portions of the recesses y to temporarily fasten the lid member g to the upper half c.

Meanwhile, the locking member v is temporarily fastened to the lower half d.

Then, when the upper half c and the lower half d are coupled to each other, since the spring anchoring portion w of the locking member is positioned at a higher position than the stopper portion z when the cassette case b is in an assembled condition, the arm q of the torsion spring n resiliently contacts from above with the spring anchoring portion w of the locking member v to exert a pivoting force to pivot the locking member v toward its locking position, that is, in the clockwise direction in FIGS. 11 and 12. In this condition, however, since the locking member v will be pivoted excessively in the clockwise direction until it abuts with the front lid h, the locking member v cannot be assembled.

Further, when the tape cassette a is loaded into a recording and reproduction apparatus, the lower end portion of the locking member v is pushed rearwardly by the unlocking member x to unlock the lid member g from the locking member v as described above. In this instance, there is no problem if the unlocking member x keeps the locking member v at its unlocking position even after such unlocking, but if not, the locking member v will be pivoted excessively in the clockwise direction. Consequently, when the lid member g returns to its closed position, it cannot be locked by the locking member v.

Therefore, an abutting portion α is formed at a front edge portion of the locking member v such that it abuts from below with the stopper portion z of the upper half c to prevent the upper half c from pivoting in the clockwise direction any more.

In the conventional tape cassette as described above, the stopper portion z must be provided between the fulcrum of pivotal motion of the lid member g and the fulcrum of pivotal motion of the locking member v, and the position at which the stopper portion z is provided is limited to a position at which the arm q of the torsion spring n can be temporarily fastened to and the abutting portion α of the locking member v can be contacted with the stopper portion z.

Accordingly, when it is intended to promote minimization, the space for formation of the stopper portion z makes a dead space and provides a disadvantage to minimization.

SUMMARY OF THE INVENTION

It is an object of the present invention to provide a tape cassette which is convenient for minimization.

In order to attain the object described above, according to an aspect of the present invention, there is provided a tape cassette, comprising a cassette case having a flattened box-like profile, a recording medium tape accommodated in the cassette case with a portion thereof led out to a front face portion of the cassette case, a lid member supported for pivotal motion on the cassette case between a closed position in which the lid member covers over the portion of the recording medium tape positioned outside the cassette case to protect the recording medium tape when the tape cassette is not used and an open position in which the lid member allows use of the recording medium tape when the tape cassette is used, the cassette case being formed from an upper half and a lower half coupled in a vertical aligned relationship to each other, a locking member supported for pivotal motion on the cassette case between a locking position at which the locking member locks the lid member at the closed position when the tape cassette is not used and an unlocking position at which the locking member unlocks the lid member, a resilient member for biasing the lid member toward the closed position and biasing the locking member toward the locking position, and stopper means formed on the lower half of the cassette case for abutting with an abutting portion provided on the locking member when the locking member is pivoted toward the locking position to prevent further pivotal movement of the locking member.

With the tape cassette, since the stopper means for abutting with the abutting portion of the locking member is provided on the lower half, such a space as is inevitably provided where such stopper means is provided alternatively on the upper half as in the conventional tape cassette described hereinabove is not or little provided, and accordingly, reduction in size can be achieved.

Further, excessive pivotal motion of the locking member is prevented to allow automatic assembly of the tape cassette. Further, both of the biasing force to pivot the locking member and the biasing force to pivot the lid member are exerted from the common resilient member, and consequently, the number of parts is decreased and reduction of the production cost and saving of power in assembly of the tape cassette can naturally be achieved.

According to another aspect of the present invention, there is provided a tape cassette, comprising a cassette case formed from an upper half and a lower half coupled in a vertical aligned relationship to each other, the cassette case having a tape extraction recessed portion formed on a front face thereof, a recording medium tape accommodated in the cassette case with a portion thereof positioned along a front face of the tape extraction recessed portion of the cassette case, and a lid member for covering over the portion of the recording medium positioned along the front face of the tape extraction recessed portion of the tape cassette, the lid member including a front lid, a top lid supported for pivotal motion on the front lid, and a back lid supported for pivotal motion on the top lid, the front lid of the lid member having a pair of pivot shafts provided on the opposite side faces thereof for supporting the front lid for pivotal motion on the cassette case between a closed position in which the lid member covers over the recording medium tape and an open position in which the lid member opens the recording medium tape to expose the recording medium tape to the outside of the tape cassette, the lower half having a pair of bearing recessed portions formed therein for positioning the pivot shafts of the lid member, the lower half further having a reference hole formed therein for positioning the tape cassette when the tape cassette is loaded into a recording and/or reproduction apparatus.

According to a further aspect of the present invention, there is provided a tape cassette, comprising a cassette case formed from an upper half and a lower half coupled in a vertical aligned relationship to each other, the cassette case having a tape extraction recessed portion formed on a front face thereof, a recording medium tape accommodated in the cassette case with a portion thereof positioned along a front face of the tape extraction recessed portion of the cassette case, and a lid member for covering over the portion of the recording medium positioned along the front face of the tape extraction recessed portion of the tape cassette, the lid member including a front lid, a top lid supported for pivotal motion on the front lid, and a back lid supported for pivotal motion on the top lid, the front lid of the lid member having a pair of pivot shafts provided on the opposite side faces thereof for supporting the front lid for pivotal motion on the cassette case between a closed position in which the lid member covers over the recording medium tape and an open position in which the lid member opens the recording medium tape to expose the recording medium tape to the outside of the tape cassette, the lower half having a pair of bearing recessed portions formed therein for positioning the pivot shafts of the lid member, the lower half further having a reference hole formed therein for positioning the tape cassette when the tape cassette is loaded into a recording and/or reproduction apparatus, the back lid having a pair of guide pins provided at the opposite left and right end portions thereof, the cassette case having a pair of guideways formed on left and right inner side faces of the tape extraction recessed portion thereof for guiding the guide pins of the back lid.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
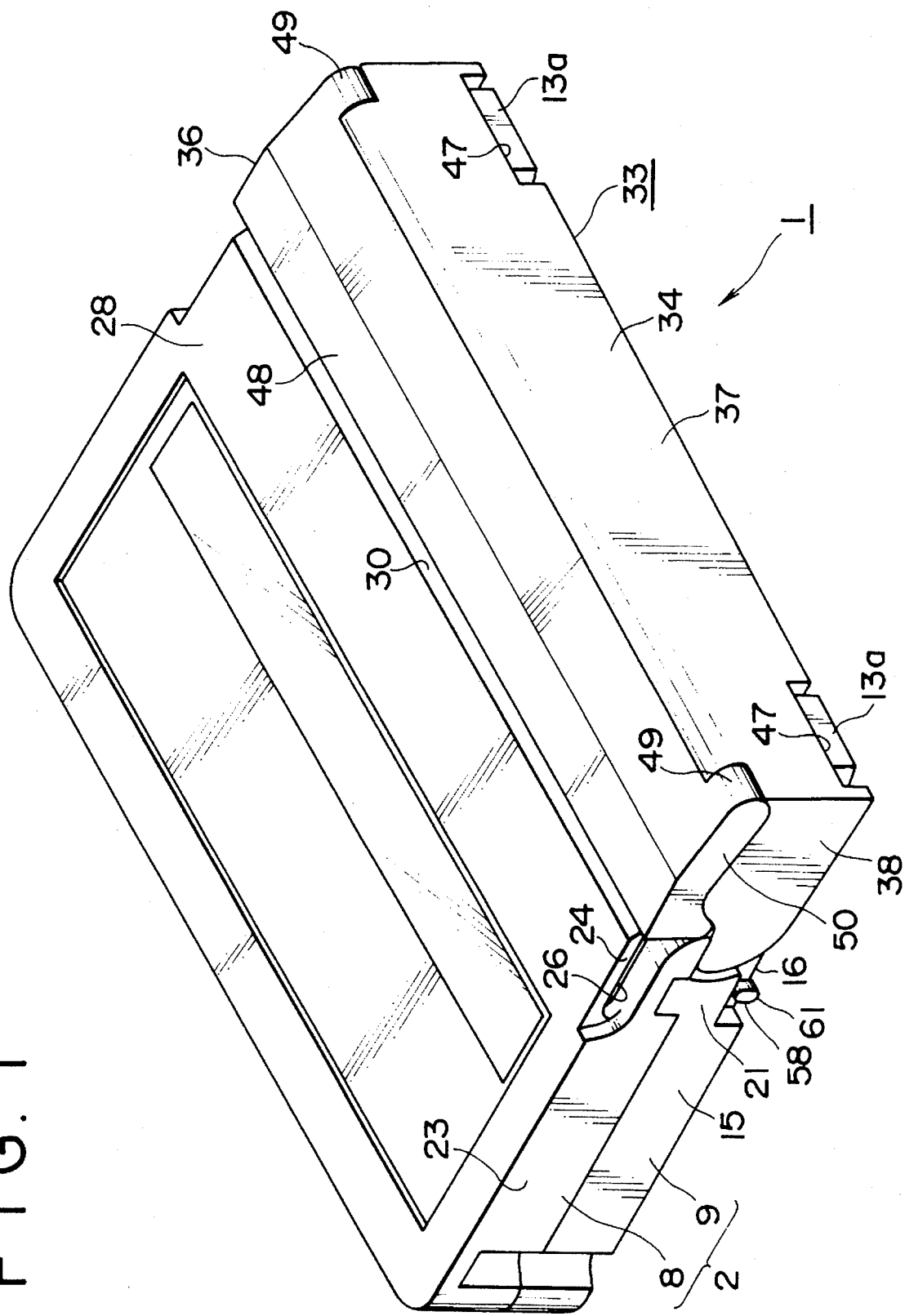
FIG. 1 is a perspective view of a tape cassette showing a preferred embodiment of the present invention.
Figure 2:
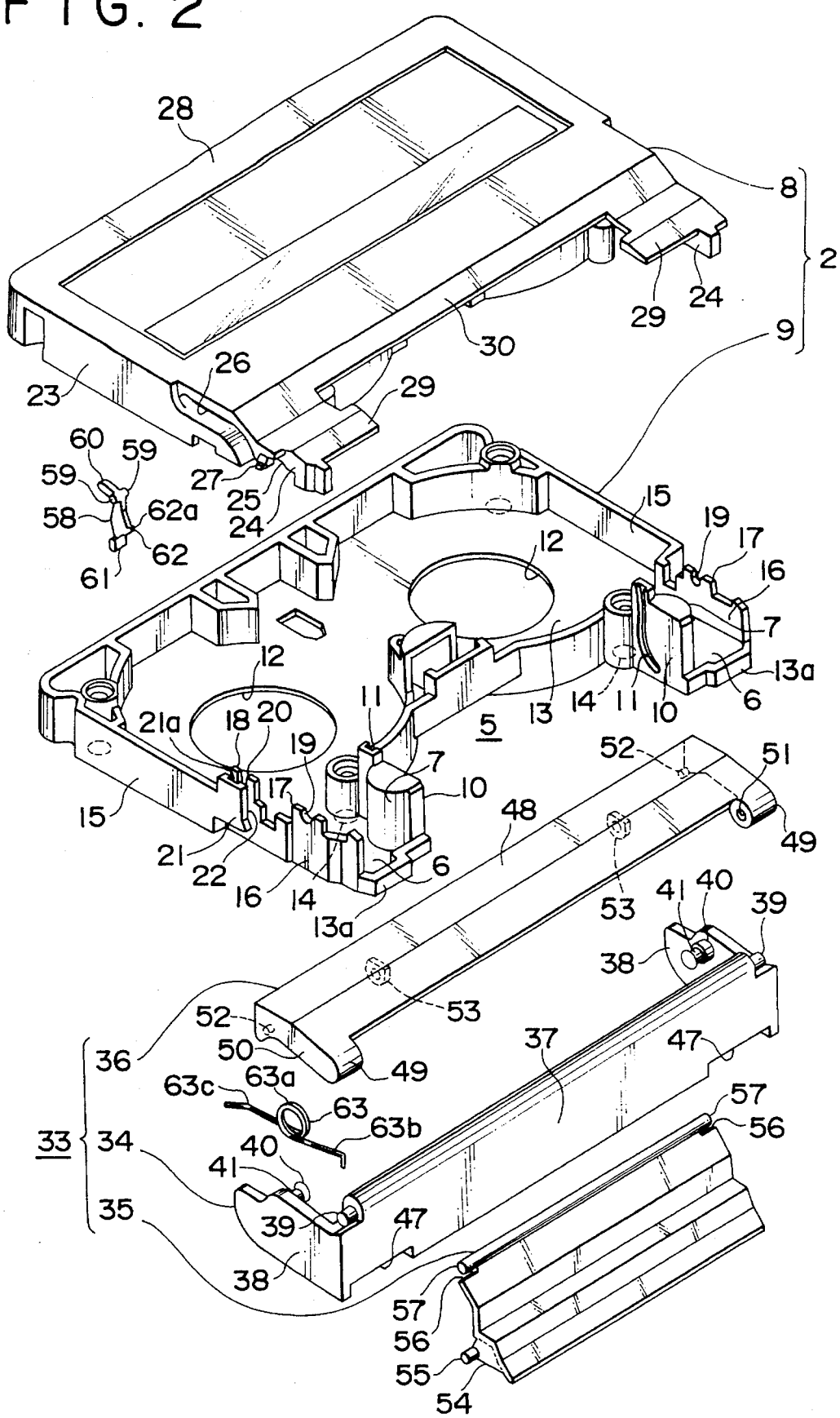
FIG. 2 is an exploded perspective view of the tape cassette of FIG. 1.
Figure 3:
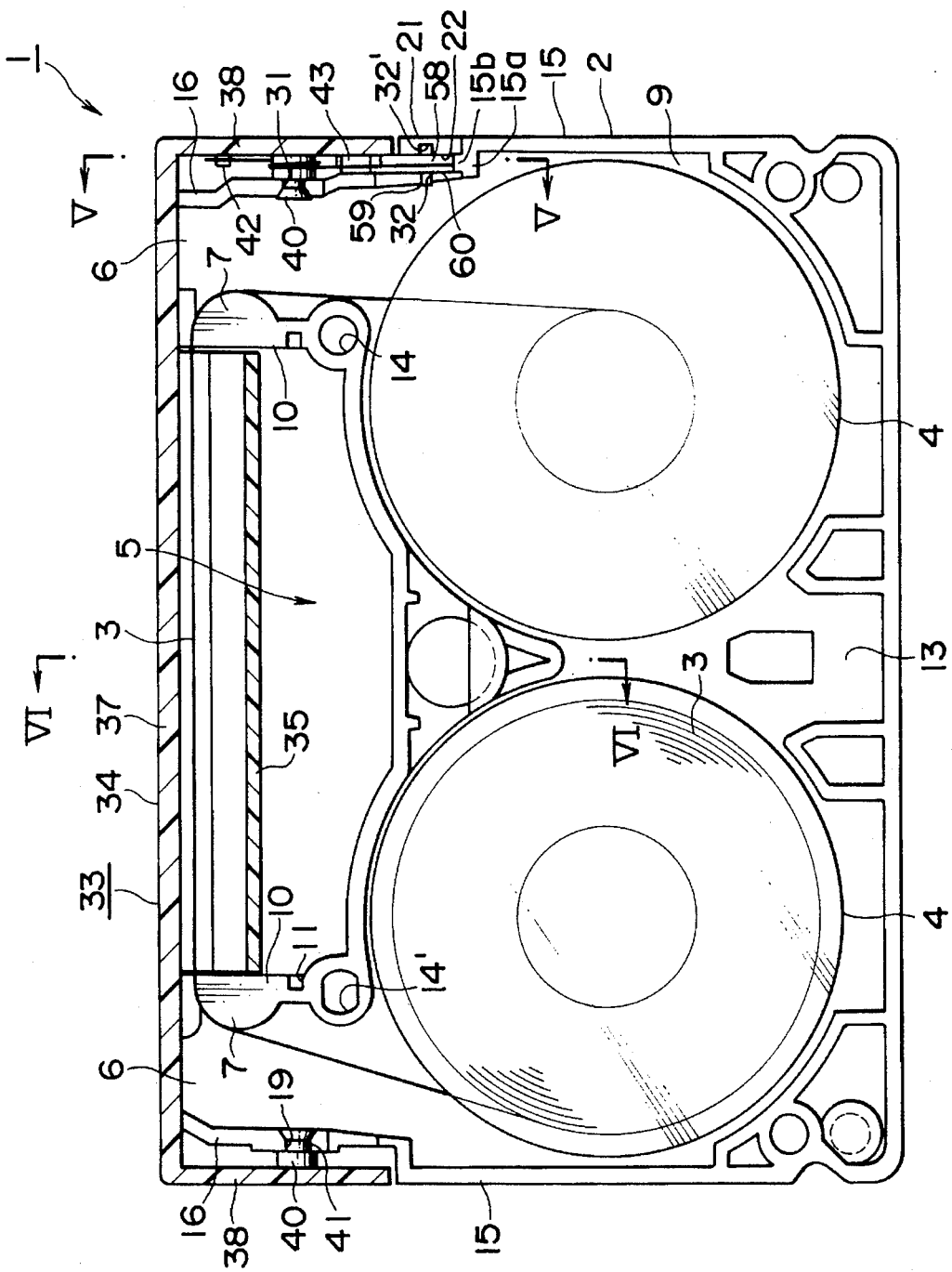
FIG. 3 is a horizontal sectional view of the tape cassette of FIG. 1.
Figure 4:
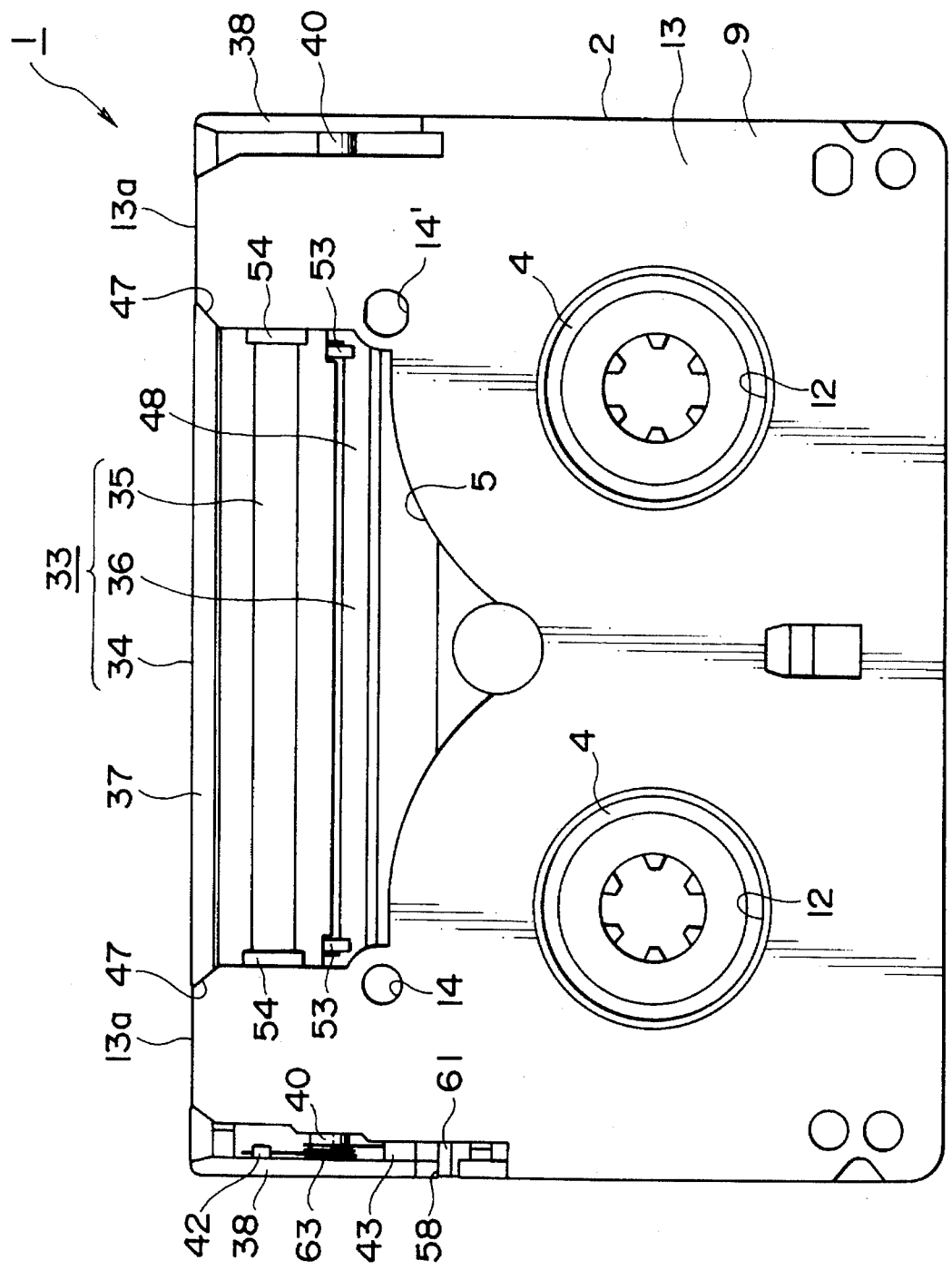
FIG. 4 is a bottom plan view of the tape cassette of FIG. 1.

Referring first to FIGS. 1 to 6, there is shown a video tape cassette to which the present invention is applied. The video tape cassette is generally denoted at 1 and includes a cassette case 2 in the form of a generally thin box having a transversely elongated rectangular shape as viewed in plan.

A pair of tape reels 4 are accommodated for rotation in the cassette case 2. A magnetic tape 3 is fastened at the opposite ends thereof individually to the tape reels 4 and wound around the tape reels 4.

The cassette case 2 has a recessed portion 5 called mouth portion formed at a central portion of a front portion thereof. The mouth portion 5 is opened at the front, top and bottom thereof.

A pair of tape exits 6 are formed at locations of the front wall of the cassette case 2 across the mouth portion 5, and a pair of in-cassette guides 7 are formed at inner end portions of the tape exits 6 adjacent the mouth portion 5.

A portion of the magnetic tape 3 is led out to the outside of the cassette case 2 past the tape exits 6 and is positioned, when the tape cassette 1 is not used, along the front face of the mouth portion 5 in a condition wrapped around the in-cassette guides 7.

The cassette case 2 is formed from a pair of upper and lower halves 8 and 9 made of a synthetic resin material and coupled in a vertical aligned relationship to each other.

Many portions of the lower half 9 including a pair of side walls have a height substantially equal to one half the height of the cassette case 2 in order to assure a necessary height of the cassette case 2 together with corresponding portions of the upper half 8. However, a pair of portions 10 of the lower half 9 serving as a pair of side walls for the mouth portion 5 have a height substantially equal to the height necessary for the cassette case 2. The in-cassette guides 7 each having a substantially semi-cylindrical profile are formed integrally on side faces of the mouth portion side walls 10.

A pair of guideways 11 are formed on side faces of the mouth portion side walls 10 adjacent the mouth portion 5 such that they extend in a moderate S-shape in the vertical direction.

A pair of exposure holes 12 are formed in a leftwardly and rightwardly spaced relationship in the forward and rearward direction substantially at middle locations of a bottom wall 13 of the lower half 9 for exposing lower end portions of the reel hubs of the tape reels 4 to the outside of the cassette case 2.

A pair of reference holes 14 and 14' are formed in the bottom wall 13 of the lower half 9 such that they are opened to the bottom face of the bottom wall 13.

The lower half 9 has a pair of side walls 15 whose front end portions 16 are offset inwardly from the other portions of the side walls 16, and a pair of protrusions 17 and a further protrusion 18 are formed at substantially mid locations of the side wall front end portions 16 in the forward and rearward direction and a rear end portion of the right side wall front end portion 16, respectively, such that they have a height greater than the other portions of the side wall front end portions 16.

A pair of rather large U-shaped recesses 19 are formed on the front side protrusions 17 such that they are opened to the top edges of the front side protrusions 17, and a rather small U-shaped recess 20 is formed on the rear side protrusion 18 such that it is opened to the upper edge of the rear side protrusion 18.

A covering portion 21 is formed to extend forwardly from an upper half portion of an outer end of a bent portion 15a of the right side wall 15 contiguous to a rear end of the front end portion 16. The covering portion 21 is positioned such that it covers over the protrusion 18 and a portion extending downwardly from the protrusion 18 with a narrow space 22 left therebetween. A U-shaped recessed portion 21a is formed at a location of an upper end portion of the covering portion 21 opposing to the recess 20 such that it is opened to the opposing face and an upper edge of the covering portion 21. An upper edge 15b of the bent portion 15a serves as a stopper portion for abutting with an abutting portion of a locking member which will be hereinafter described to restrict pivotal motion of the locking member.

Front end portions 24 of a pair of side walls 23 of the upper half 8 are positioned in an offset relationship from the other portions of the side walls 23. A pair of small arcuate recesses 25 are formed at locations of lower edges of the side wall front portions 24 displaced a little forwardly of the middle in the forward and rearward direction.

A pair of guideways 26 are formed on outer side faces of rear half portions of the side wall front end portions 24. The guideways 26 extend, at rear half portions thereof, horizontally at positions adjacent upper ends of the side wall front end portions 24 and are curved moderately, at rear half portions thereof, such that they are displaced downwardly towards the front from the front ends of the rear half portions.

Further, a spring anchoring projection 27 is formed at a portion of the outer side face of the right side wall front end portion 24 positioned below the front end portion of the guideway 26.

Front end portions 29 of a top plate 28 of the upper half 8 are formed at locations a little lower than the other portions of the top plate 28, and the front end portions 29 and the other portion of the top plate 28 are connected to each other by way of an inclined portion 30.

The upper and lower halves 8 and 9 are coupled in a vertically aligned relationship to each other to form the cassette case 2.

A pair of support holes 31 for supporting a lid member which will be hereinafter described are formed from the recesses 19 formed at the side wall front end portions 16 of the lower half 9 and the recesses 25 formed at the side wall front end portions 24 of the upper half 8.

The upper edge openings of the recess 20 and the recessed portion 21a formed in the right side wall front end portion 16 and the covering portion 21 of the lower half 9 are closed up with a lower edge of the right side wall front end portion 24 of the upper half 8 and a lower edge of an outer end portion of a portion of the side wall 23 adjacent the front end portion 24 to form a further support hole 32 and a support recessed portion 32' for supporting pivot shafts of a lid locking member which will be hereinafter described, respectively.

Subsequently, a lid member for protecting a portion of the magnetic tape 3 exposed outside the cassette case 2 will be described.

The lid member 33 includes a front lid 34 for covering over a front face of the portion of the magnetic tape 3 exposed outside the cassette case 2 and the fronts of the tape exits 6, a back lid 35 for covering over a rear side and a lower side of the magnetic tape 3 in the mouth portion 5, a top lid 36 for covering over an upper side of the mouth portion 5. The lids 34, 35 and 36 are formed from a synthetic resin material.

The front lid 34 has a front face portion 37 in the form of a plate of a size sufficient to cover over the entire front face of the cassette case 2, and a pair of side face portions 38 extending rearwardly from the opposite left and right ends of and formed integrally with the front face portion 37. An upper edge of the front face portion 37 is recessed at the opposite left and right ends thereof, and a pair of support pins 39 are provided on leftwardly and rightwardly directed outer side faces of the recessed portions.

A pair of pivot shafts 40 are provided at and extend inwardly from locations of the side face portions 38 of the front lid 37 displaced a little rearwardly from the center in the front and rear direction adjacent upper edges of the side face portions 38. A pair of circumferentially extending engaging grooves 41 are formed on outer peripheral faces adjacent ends of the pivot shafts 40.

Further, a spring anchoring projection 42 is provided at a location of the inner face of the right side face portion 38 adjacent the front end displaced a little upwardly from the center in the vertical direction, and an arresting projection 43 is provided substantially at a center of the inner face of a rear end portion of the side face portion 38. The arresting projection 43 has a rib 44 extending in the vertical direction and a projection 45 extending rearwardly from a mid location of the rib 44, and an arresting recessed portion 46 of a downwardly open substantially inverted V-shape is defined between the rib 44 and the projection 45.

A pair of recesses 47 are formed at the opposite end portions of the lower edge of the front face portion 37 in a substantially opposing relationship to a pair of portions of a front edge portion of the bottom wall 13 of the lower half 9 except the mouth portion 5.

The front lid 34 is engaged, at the engaging grooves 41 of the pivot shafts 40 thereof, with the open edges of the support holes 31 of the cassette case 2 to support the front lid 34 for pivotal motion in the upward and downward directions on the cassette case 2.

The top lid 36 has a main portion 48 substantially in the form of a plate which covers over the front end portions 29 of the top plate 28 of the upper half 8 and the top of the mouth portion 5 as well as a portion of the inclined portion 30 other than the rear end portion, a pair of connection portions 49 extending forwardly from the opposite ends a front edge of the main portion 48, and a pair of side wall portions 50 depending from the outer end edges of the main portion 48 and connected at front ends thereof to the connecting portions 49.

A pair of support holes 51 are formed at inner end faces, that is, in a pair of mutually opposing faces of the connecting portions 49. Further, a pair of guide pins 52 are provided on inner faces, that is, a pair of mutually opposing faces, of rear end portions of the side wall portions 50.

A pair of support pieces 53 are provided in a leftwardly and rightwardly spaced relationship at locations of a lower face of the main portion 48 with respect to the center in the leftward and rightward direction and substantially at the middle in the forward and rearward direction. A support hole 53a is formed in each of the support pieces 53.

The support pins 39 of the front lid 34 are fitted for pivotal motion in the support holes 51 of the top lid 36 so that the front end portion of the front lid 34 is connected for pivotal motion to an upper end portion of the front face portion 37 of the front lid 34. Further, the guide pins 52 of the top lid 36 are held in sliding engagement with the guideways 26 formed on the side wall front end portions 24 of the upper half 8.

The back lid 35 is in the form of a plate of a rectangular shape whose length is substantially equal to the leftward and rightward width of the mouth portion 5. A pair of tabs 54 extend rearwardly from the opposite left and right ends of the lower end portion of the back lid 35. A pair of guide pins 55 are provided on outer faces of the rear end portions of the tabs 54.

An upper end edge of the back lid 35 is formed substantially in a round bar, and a pair of recesses 56 are formed at locations of the opposite side edges of the back lid 35 adjacent the upper end to define a pair of support pins 57 at the opposite side ends of the upper end of the back lid 35.

The support pins 57 of the back lid 35 are fitted for pivotal motion in the support holes 35a of the support pieces 53 of the top lid 36 so that the back lid 35 is supported at the upper end portion thereof for pivotal motion on the lower face of the main portion 48 of the top lid 36. The guide pins 55 of the back lid 35 are fitted for sliding movement in the guideways 11 formed on the mouth portion side walls 10 of the cassette case 2.

The lid member 33 constituted from the front lid 34, the back lid 35 and the top lid 36 is supported for movement between a closed position and an open position on the cassette case 2.

Figure 5:
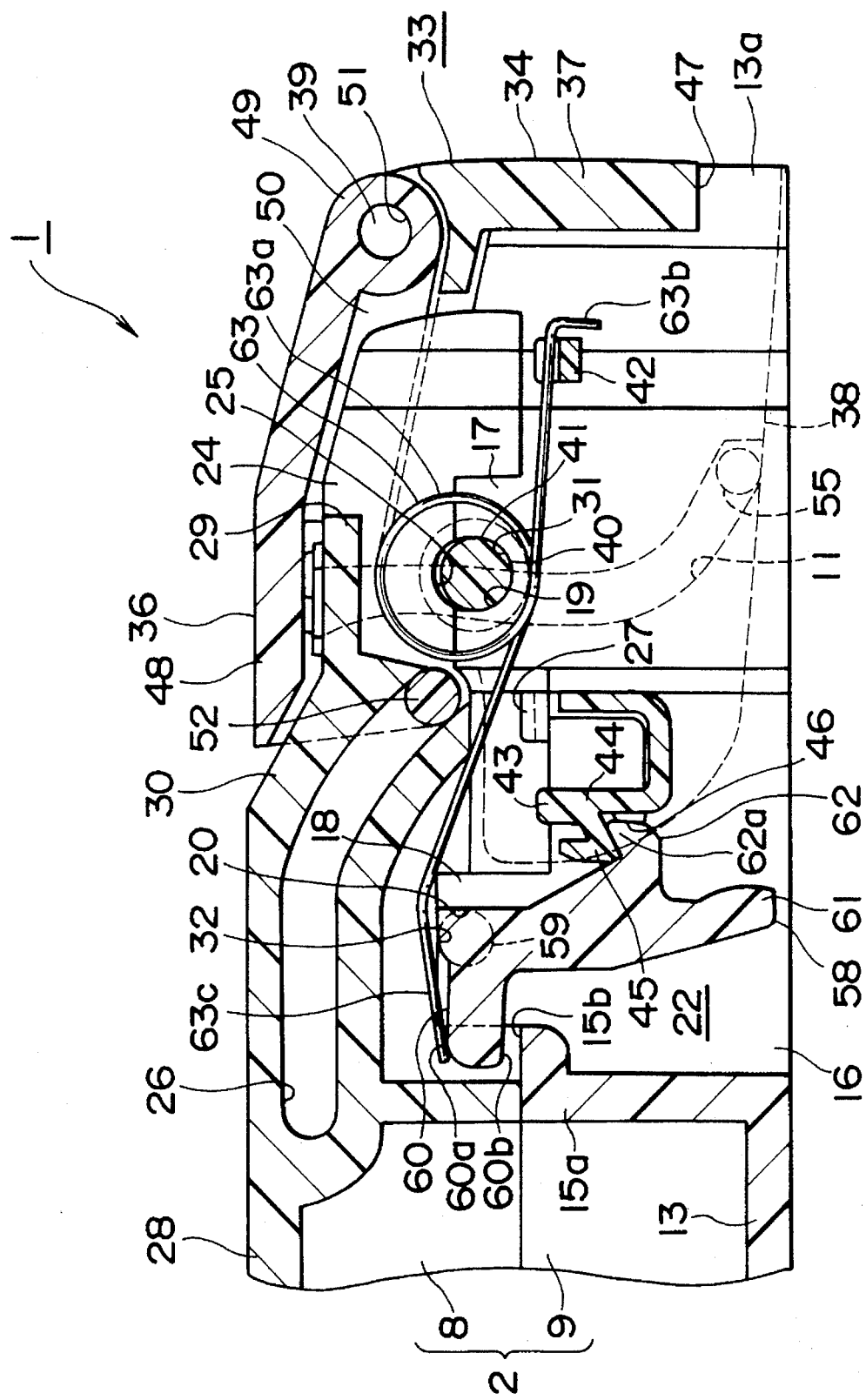
FIG. 5 is an enlarged sectional view taken along line V—V in FIG. 3.
Figure 6:
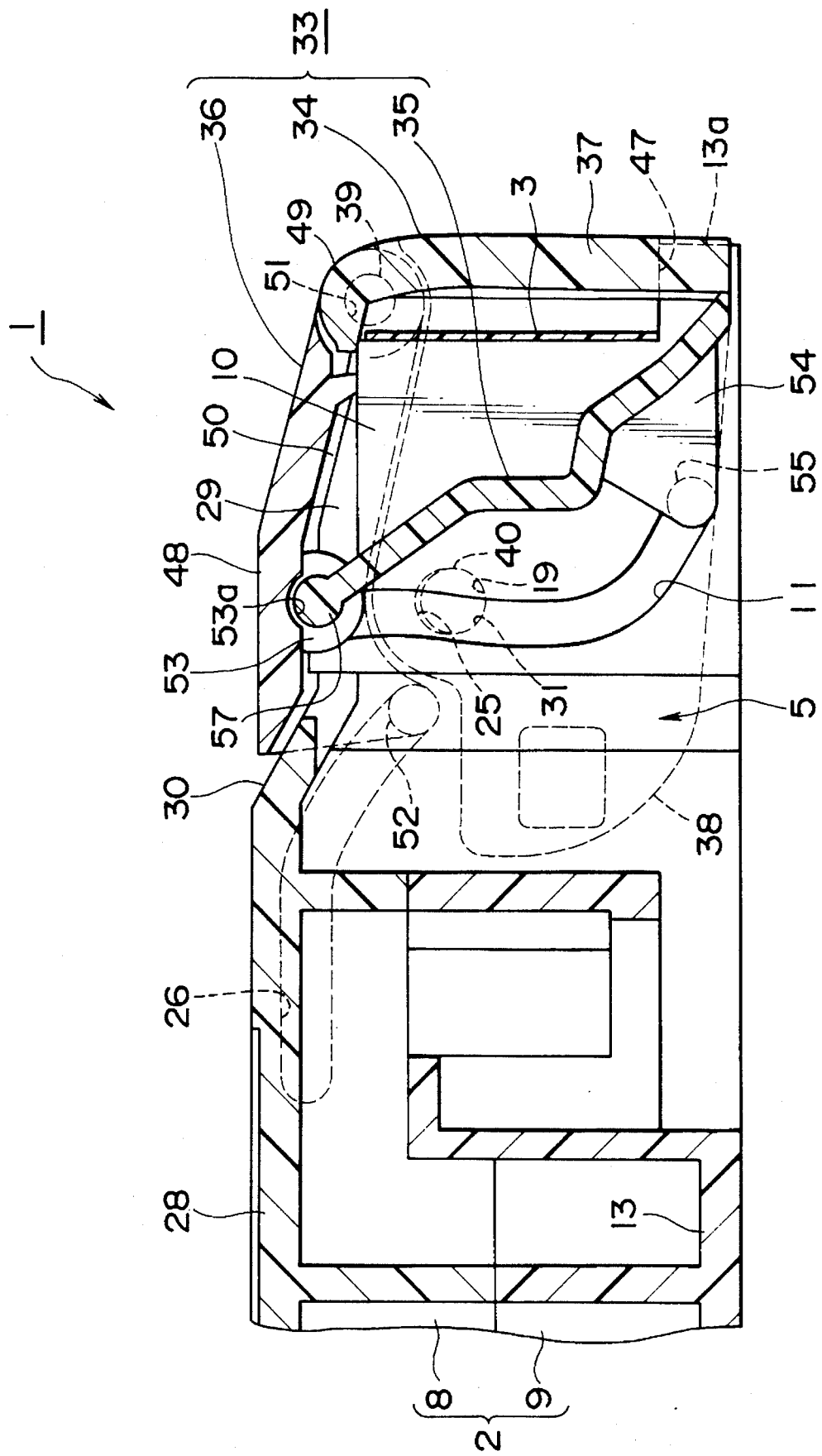
FIG. 6 is an enlarged sectional view taken along line VI—VI of FIG. 3.

The condition wherein the lid member 33 is in its closed position is shown in FIGS. 5 and 6. In this condition, the front face portion 37 of the front lid 34 covers over the front of the cassette case 2 and the front side of the portion of the magnetic tape 3 led out to the outside of the cassette case 2, and the upper edges of the recesses 47 of the front face portion 37 contact with upper faces of front end portions of the front end portions 13a of the bottom wall 13 of the cassette case 2.

Further, when the lid member 33 is in its closed position, the guide pins 55 of the back lid 35 are positioned at the lower end portions of the guideways 11 and positioned in the mouth portion 5 in a forwardly downwardly inclined condition on the rear side of the magnetic tape 3 such that the lower end of the back lid 35 contacts with the rear face of the front face portion 37 of the front lid 34 and the back lid 35 cooperates with the front face portion 37 of the front lid 34 to cover over the top of the magnetic tape 3 except the portion positioned within the mouth portion 5.

Further, the guide pins 52 of the top lid 36 are positioned at the front end portions of the guideways 26 of the cassette case 2, and the main portion 48 of the top lid 36 is positioned in such a manner as to cover over the front end portions 29 of the top plate 28 of the cassette case 2 and the top of the mouth portion 5 thereby to cover over the top of the portion of the magnetic tape 3 positioned in the mouth portion 5.

Thus, when the lid member 55 is in its closed position, the portion of the magnetic tape 3 positioned in the mouth portion 5 is completely covered with the front face portion 37 of the front lid 34, the back lid 35 and the main portion 48 of the top lid 36.

A lid locking member 58 is formed from a synthetic resin material.

Figure 8:
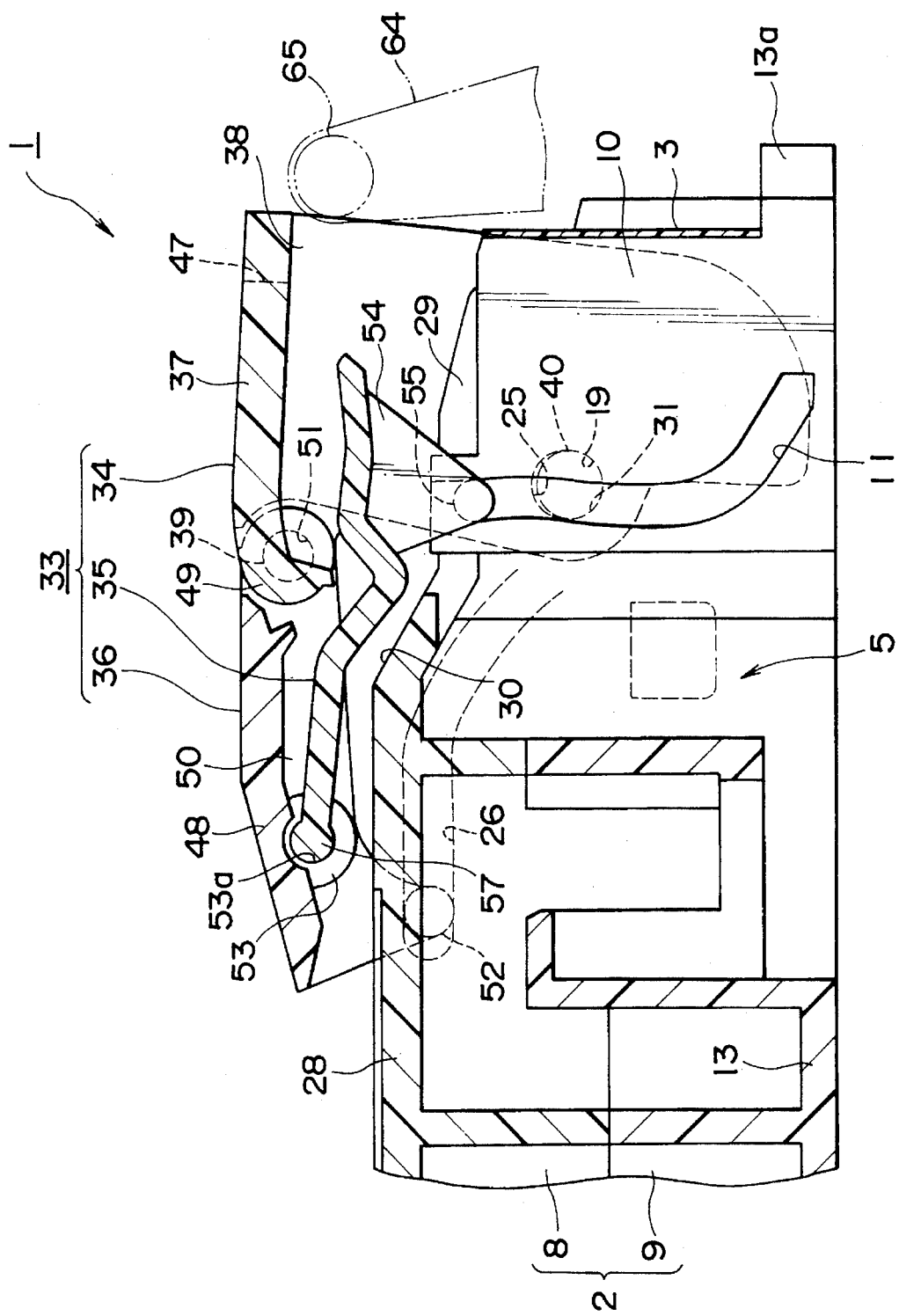
FIG. 8 is an enlarged sectional view taken along line VI—VI in FIG. 3 but showing the lid member at the open position.
Figure 9:
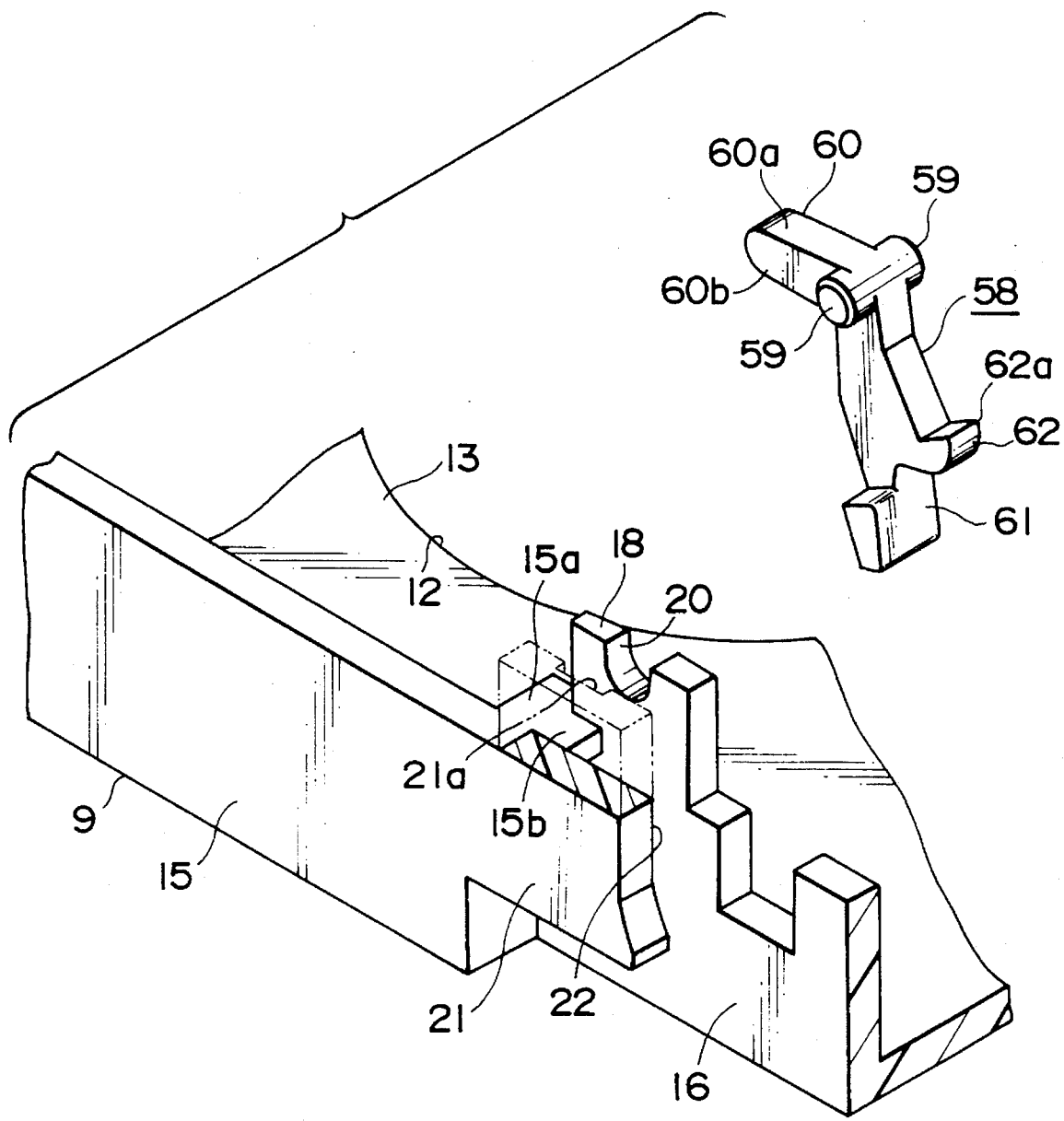
FIG. 9 is a fragmentary perspective view showing, in an enlarged scale, a lid locking member and a portion of a lower half on which the lid locking member is supported.

Referring particularly to FIG. 8, the lid locking member 58 is in the form of a vertically elongated plate and has a pair of support pins 59 formed integrally thereon such that they extend in the opposite directions from an upper end of the lid locking member 58. Further, a projecting piece 60 is formed to extend rearwardly from an upper end portion of the lid locking member 58, and an upper face 60a at a rear end portion of the projecting piece 60 serves as a spring anchoring portion while a lower face 60b at the rear end portion of the projecting piece 60 serves as an abutting portion. Further, the lid locking member 58 is projected at an outer side face of a lower end portion thereof to form a lower end portion 61 of an increased thickness, which serves as an acting portion.

The lid locking member 58 further has a locking piece 62 extending forwardly from a substantially mid location thereof in the vertical direction, and a locking pawl 62a is formed to extend upwardly from an end of the locking piece 62.

The support pins 59 of the lid locking member 58 are received individually in the support hole 32 and the support recessed portion 32' of the cassette case 2 so that the locking member 58 is supported for pivotal motion on the cassette case 2. Pivoting motion of the lid locking member 58 toward its locking position is restricted by the abutting portion 60b of the lid locking member 58 abutting with the stopper portion 15b of the lower half 9 so that the lid locking member 58 may not pivot excessively toward the locking position.

Figure 10:
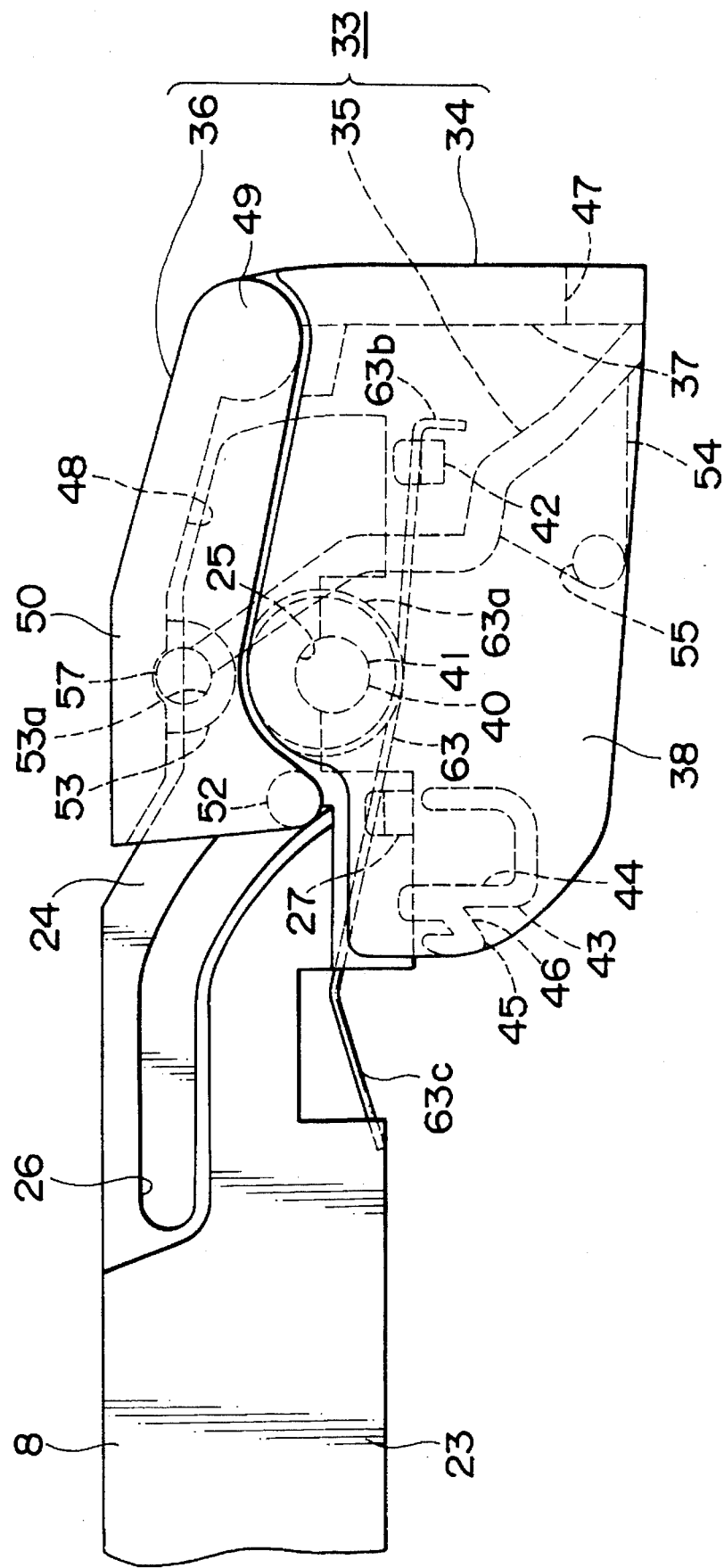
FIG. 10 is an enlarged side elevational view of the tape cassette of FIG. 1 with the lid member temporarily fastened to an upper half.

Referring particularly to FIG. 10, a torsion spring 63 biases the lid member 33 toward the closed position and has a coiled portion 63a and a pair of arms 63b and 63c extending from the coiled portion 63a.

The coiled portion 63a of the torsion spring 63 is positioned in an outwardly fitted condition on the right side pivot shaft 40 of the front lid 34, and the arm 63b of the torsion spring 63 resiliently contacts from above with the spring anchoring portion 60a of the front lid 34 while the other arm 63c of the torsion spring 63 resiliently contacts from above with the spring anchoring portion 60a of the lid locking member 58. Consequently, the front lid 34 is normally acted upon by a pivoting force toward the closed position, that is, in the clockwise direction in FIGS. 5 and 6 while the lid locking member 58 is normally acted upon by another pivoting force toward the locking position, that is, in the counterclockwise direction in FIGS. 5 and 6.

When the lid member 33 is in its closed position shown in FIGS. 5 and 6, the position of the front lid 34 is defined as the upper edges of the recesses 47 of the front face portion 37 thereof are abutted with the upper faces of front edge portions of the front end portions 13a of the bottom wall 13 of the cassette case 2. Meanwhile, the locking pawl 62a of the lid locking member 58 is engaged with the arresting recessed portion 46 of the arresting projection 43 formed on the right side face portion 38 of the front lid 34 to lock the lid member 33 at its closed position.

When the tape cassette 1 is held, for example, by a cassette holding member provided on a recording and reproduction apparatus in the process while it is loaded into the recording and reproduction apparatus, the acting portion 61 of the lid locking member 58 is pushed rearwardly by an unlocking member provided on the cassette holding member so that the lid locking member 58 is pivoted in the clockwise direction in FIGS. 5 and 6 against the resilient pivoting force exerted by the torsion spring 63 so that the locking pawl 62a thereof is disengaged from the arresting recessed portion 46 of the front lid 34 to unlock the lid member 33.

Then, in the process while the tape cassette 1 is moved down to a cassette loading section of the recording and reproduction apparatus, a pressing pin 65 of a lid raising member 64 (FIGS. 7 and 8) provided on the recording and reproduction apparatus is abutted with a lower edge of the side face portions 38 of the front lid 34 to push the side face portions 38 relatively upwardly. Consequently, the front lid 34 is pivoted in the counterclockwise direction in FIGS. 5 and 6, whereupon also the top lid 36 and the back lid 35 are moved toward their open positions shown in FIGS. 7 and 8.

Figure 7:
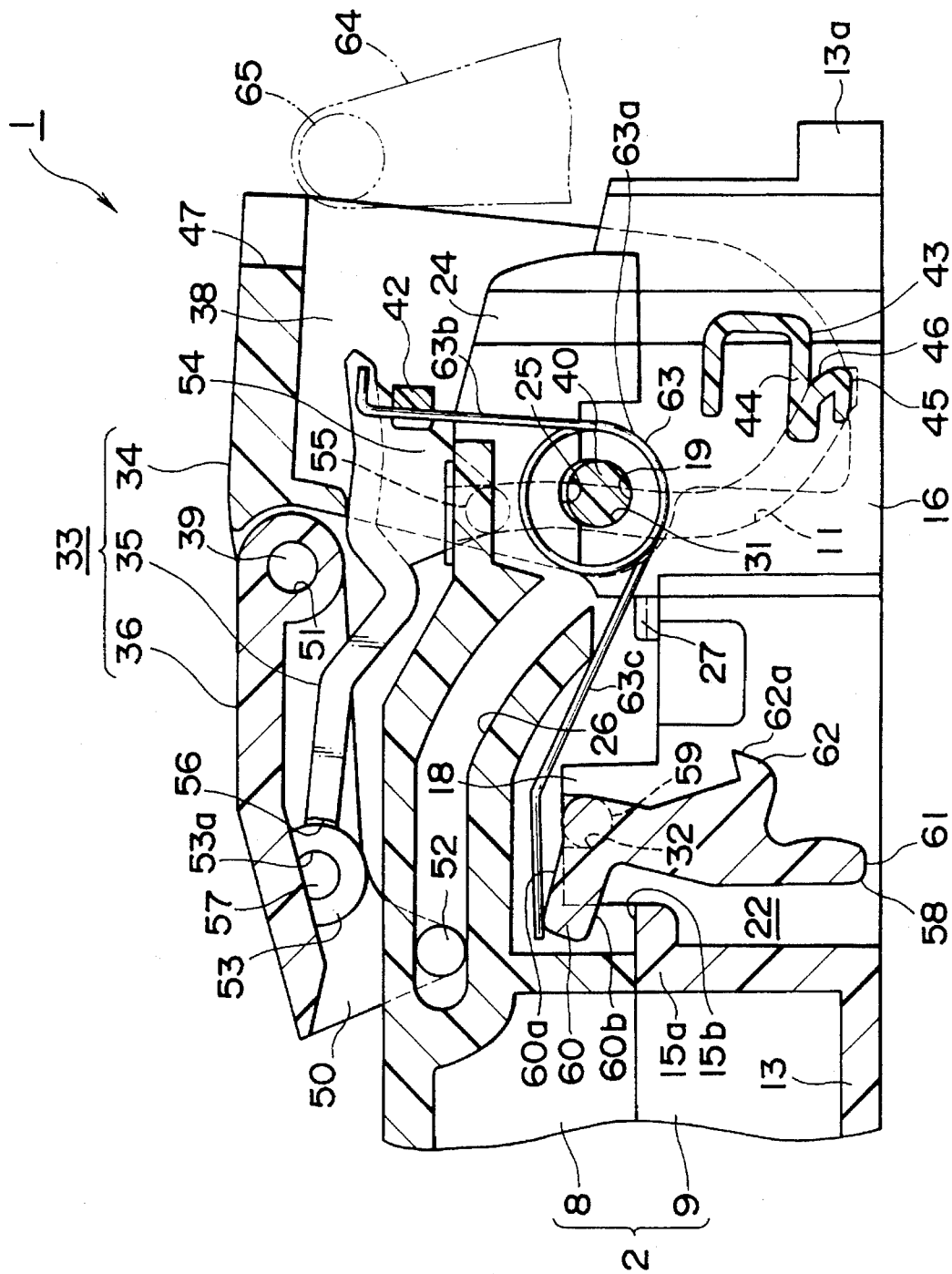
FIG. 7 is an enlarged sectional view taken along line V—V in FIG. 3 but showing a lid member at an open position.

The condition wherein the lid member 33 is in its open position is shown in FIGS. 7 and 8. In this condition, the front lid 34 is at a position pivoted substantially by 90 degrees in the counterclockwise direction from its closed position shown in FIGS. 5 and 6, and the front of the cassette case 2 and the magnetic tape 3 are exposed completely.

Meanwhile, the back lid 35 is positioned along the inclined portion 30 of the top plate 28 of the cassette case 2 and a portion connecting rearwardly to the inclined portion 30. It is to be noted that the posture of the back lid 35 is controlled, during its movement from the closed position shown in FIGS. 5 and 6 to the open position shown in FIGS. 7 and 8, by the positions of the support pins 57 supported on the top lid 36 and the positions of the guide pins 55 which are guided by the guideways 11 of the cassette case 2.

Further, the top lid 36 is positioned in a posture substantially parallel to the top plate 28 of the cassette case 2 above the back lid 35. It is to be noted that the posture of the top lid 36 is controlled, during its movement from the closed position shown in FIGS. 5 and 6 to the open position shown in FIGS. 7 and 8, by the positions of the connecting portions 49 supported on the front lid 34 and the guide pins 52 which are guided by the guideways 26 of the cassette case 2.

Subsequently, temporary fastening of the lid member 33 to the upper half 8 in the course of assembly of the tape cassette 1 will be described.

After the lids 34, 35 and 36 of the lid member 33 are coupled as described above, the arm 63b of the torsion spring 63 is resiliently contacted from above with the spring anchoring projection 42 of the front lid 34 while the coil portion 63a of the torsion spring 63 is fitted around the pivot shaft 40 of the right side face portion 38 of the front lid 34. Then, the guide pins 52 of the upper lid 36 are engaged into the guideways 26 of the upper half 8, and the engaging grooves 41 of the pivot shafts 40 of the front lid 34 are engaged with the edges of the small arcuate recesses 25 of the upper half 8. Thereafter, the other arm 63c of the torsion spring 63 is resiliently contacted from above with the spring anchoring projection 27 of the upper half 8.

Consequently, the front lid 34 is acted upon by an upward moving force exerted by a resilient force of the torsion spring 63 so that faces of the engaging grooves 41 of the pivot shafts 40 thereof are resiliently pressed against the edges of the recesses 25 of the upper half 8, thereby temporarily fastening the lid member 33 to the upper half 8.

The assembling operation for the tape cassette 1 is facilitated as the lid member 33 is temporarily fastened to the upper half 8 in this manner.

Then, after the upper half 8 and the lower half 9 are assembled, since the spring anchoring projection 27 of the upper half 8 is positioned lower than the spring anchoring portion 60a of the lid locking member 58, the arm 63c of the torsion spring 63 resiliently contacts from above with the spring anchoring portion 60a of the lid locking member 58.

Since the lid locking member 58 is resiliently contacted, at the spring anchoring portion 60a thereof, from above by the arm 63c of the torsion spring 63, it is acted upon by a pivoting force in the counterclockwise direction in FIGS. 5 and 6. However, the abutting portion 60b of the lid locking member 58 is abutted with the stopper portion 15b provided on the lower half 9 to prevent further pivotal motion of the lid locking member 58 in the counterclockwise direction. Consequently, the lid locking member 58 will not be pivoted excessively toward the locking position, and accordingly, an otherwise possible obstacle to automatic assembly of the tape cassette arising from such excessive pivotal movement of the lid locking member 58 toward the locking position can be prevented.

It is to be noted that, while the spring anchoring projection 27 for temporarily fastening the arm 63c of the torsion spring 63 is formed on the upper half 8, the position of formation of the spring anchoring projection 27 may be determined taking only temporary fastening of the arm 63c of the torsion spring 63 into consideration but the function of restricting the pivotal motion of the lid locking member 58 need not taken into consideration at all. Accordingly, the degree of freedom in designing is high, and appearance of a dead space can be eliminated or at least minimized, resulting in little possibility that such dead space may make an obstacle to minimization.

Further, since the stopper portion 15b provided on the lower half 9 is provided making use of the upper edge of the bent portion 15a of the side wall 15 which is provided inevitably on the lower half 9, there is no necessity of producing a special metal mold, and a metal mold can be constructed readily.

Figure 11:
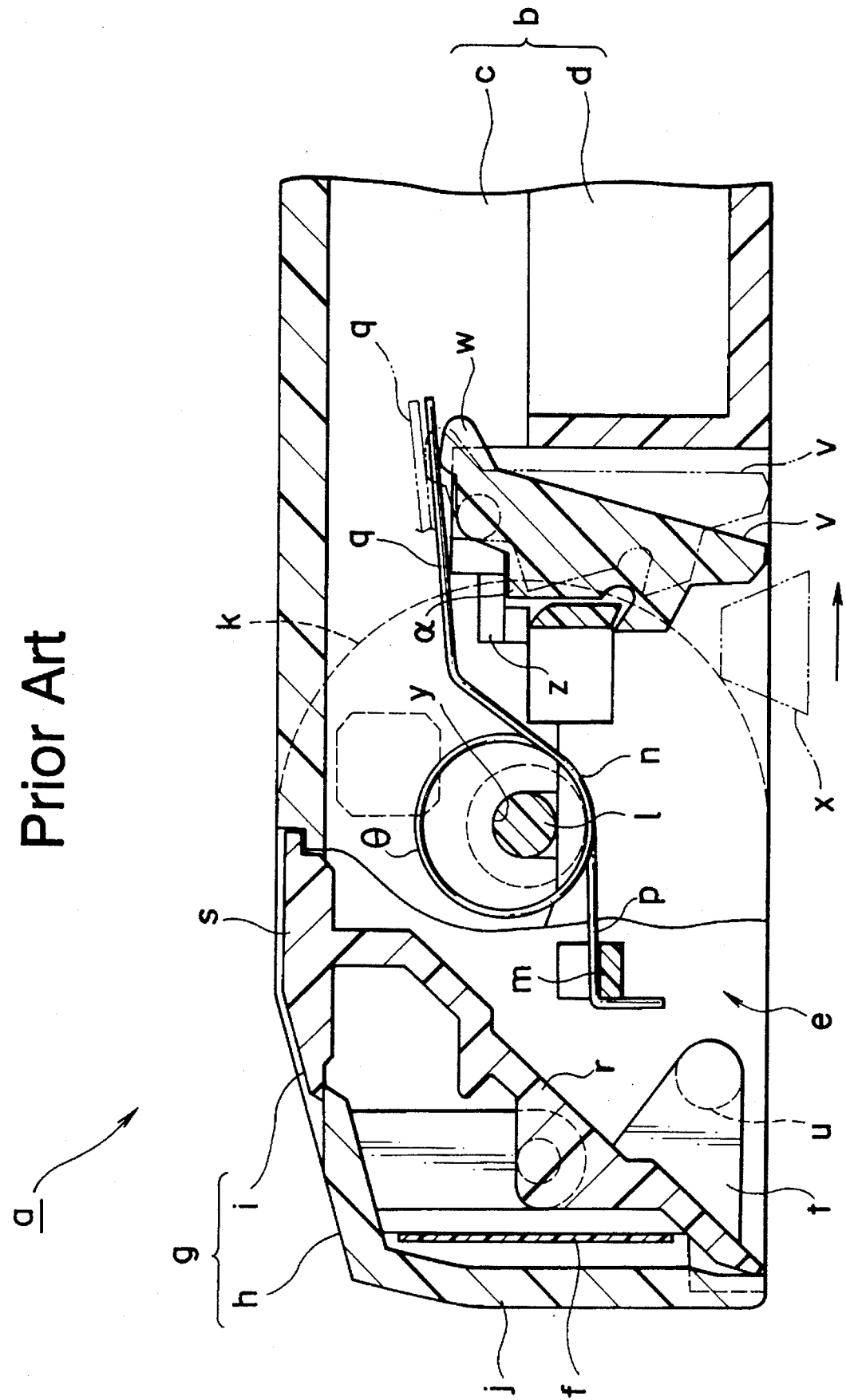
FIG. 11 is a sectional view of a conventional tape cassette when a lid member is at its closed position.
Figure 12:
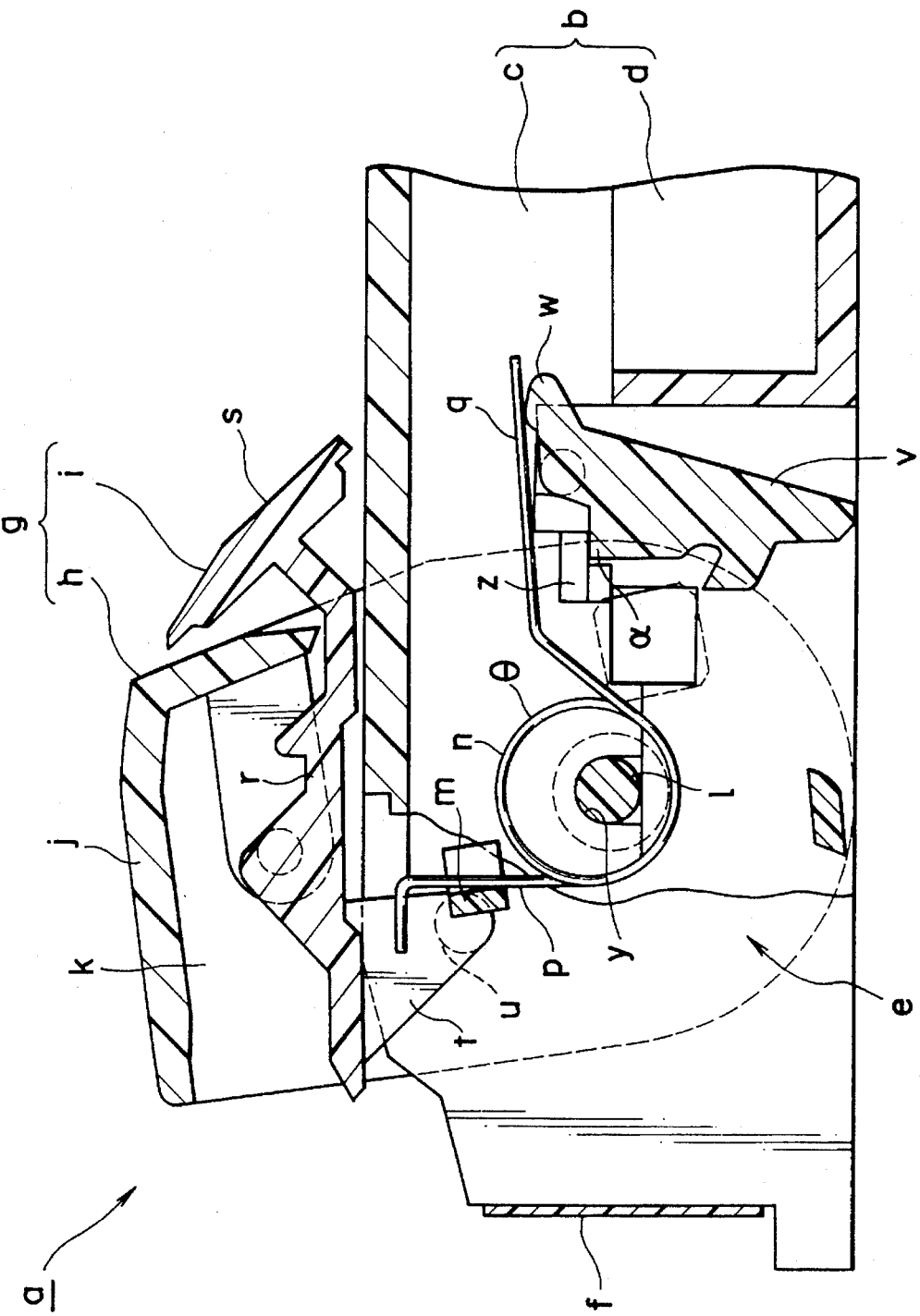
FIG. 12 is a sectional view of the conventional tape cassette of FIG. 11 when the lid member is at its open position.

It is to be noted that, while the lid member in the embodiment described above includes three components of the front lid, the back lid and the top lid, the present invention can naturally be applied to a tape cassette wherein the lid member includes different components, for example, such two components of a front lid and a back lid as in the conventional tape cassette described hereinabove with reference to FIGS. 11 and 12.

Having now fully described the invention, it will be apparent to one of ordinary skill in the art that many changes and modifications can be made thereto without departing from the spirit and scope of the invention as set forth herein.

What is claimed is:

1. A tape cassette, comprising:

a cassette case having a flattened box-like profile;

a recording medium tape accommodated in said cassette case with a portion thereof led out to a front face portion of said cassette case;

a lid member supported for pivotal motion on said cassette case between a closed position in which said lid member covers the portion of said recording medium tape positioned outside said cassette case to protect said recording medium tape when said tape cassette is not used and an open position in which said lid member allows use of said recording medium tape-when said tape cassette is used;

said cassette case being formed from an upper half and a lower half coupled in a vertical aligned relationship to each other;

a locking member supported for pivotal motion on said cassette case between a locking position at which said locking member locks said lid member at the closed position when said tape cassette is not used and an unlocking position at which said locking member- unlocks said lid member;

a resilient member for biasing said lid member toward the closed position and biasing said locking member toward the locking position; and stopper means formed on an upstanding side wall of said lower half of said cassette case, said stopper means including a ledge which projects forwardly away from said upstanding wall and toward the front face portion of the cassette, said ledge further having an upper surface for abutting with an abutting portion provided on said locking member when said locking member is pivoted toward the locking position to prevent further pivotal movement of said locking member, said stopper means thereby allows unimpeded rotation of said abutting portion of said locking member by positioning said ledge upper surface away from any side walls.

2. A tape cassette according to claim 1, wherein said lid member includes a front lid for covering over the front face side of said recording medium tape, a back lid for covering over the rear face side and the lower side of said recording medium tape, and a top lid for covering over the upper side of said recording medium tape.

3. A tape cassette according to claim 1, wherein said lid member includes a front lid for covering over the front face side of said recording medium tape, and a back lid for covering over the rear face side, the lower side and the upper side of said recording medium tape.

* * * * *